US005608586A

United States Patent [19]
Sri-Jayantha et al.

[11] Patent Number: 5,608,586
[45] Date of Patent: Mar. 4, 1997

[54] ROBUST SERVO FOR DISK-SHIFT COMPENSATION IN ROTATING STORAGE SYSTEM

[75] Inventors: Muthuthamby Sri-Jayantha, Ossining; Arun Sharma, New Rochelle; Hien Dang, Nanuet, all of N.Y.; Satoshi Yamamoto, Shiga-ken, Japan

[73] Assignee: International Business Machines Corporation, Armonk, N.Y.

[21] Appl. No.: 327,168

[22] Filed: Oct. 21, 1994

[51] Int. Cl.$^6$ ............................ G11B 5/596; G11B 5/035
[52] U.S. Cl. ............................ 360/77.04; 360/65
[58] Field of Search ............................ 360/77.04, 78.09, 360/46, 65

[56] References Cited

U.S. PATENT DOCUMENTS

| | | | |
|---|---|---|---|
| 5,233,586 | 8/1993 | Morisada | 360/77.04 X |
| 5,257,252 | 10/1993 | Barnes et al. | 360/78.09 X |
| 5,381,359 | 1/1995 | Abbott et al. | 360/40 X |
| 5,402,280 | 3/1995 | Supino | 360/77.04 |

*Primary Examiner*—W. C. Kim
*Assistant Examiner*—Regina Y. Neal
*Attorney, Agent, or Firm*—David Aker; Ronald L. Drumheller

[57] ABSTRACT

A method and apparatus, in a direct access storage device including a head positioned for interaction with a data storage medium mounted on a rotating spindle, an actuator for positioning the head, and a servo control loop for positioning the actuator. The improvement comprises: a narrow band gain enhancing filter for connection in the servo control loop. The filter has a response frequency related to the rotational frequency of the spindle. The filter has programmable initial states. Also provided is a switch for switching in the narrow band filter as the head approaches a target position on the data storage medium. Initial states of the filter are determined and supplied to program the filter. At least one additional filter having a peak response frequency at a harmonic of the frequency of rotation of the spindle, may be provided. Initial states of the additional filters are determined and supplied to program the additional filter. The filter may include successive delay circuits for inputs to the filter, which circuits provide delayed outputs; multipliers for multiplying selected delayed outputs by a constant; and a summer for summing the delay outputs after the delayed outputs are multiplied by the multipliers. The initial states may be stored as phase, frequency and amplitude of a sine function.

14 Claims, 10 Drawing Sheets

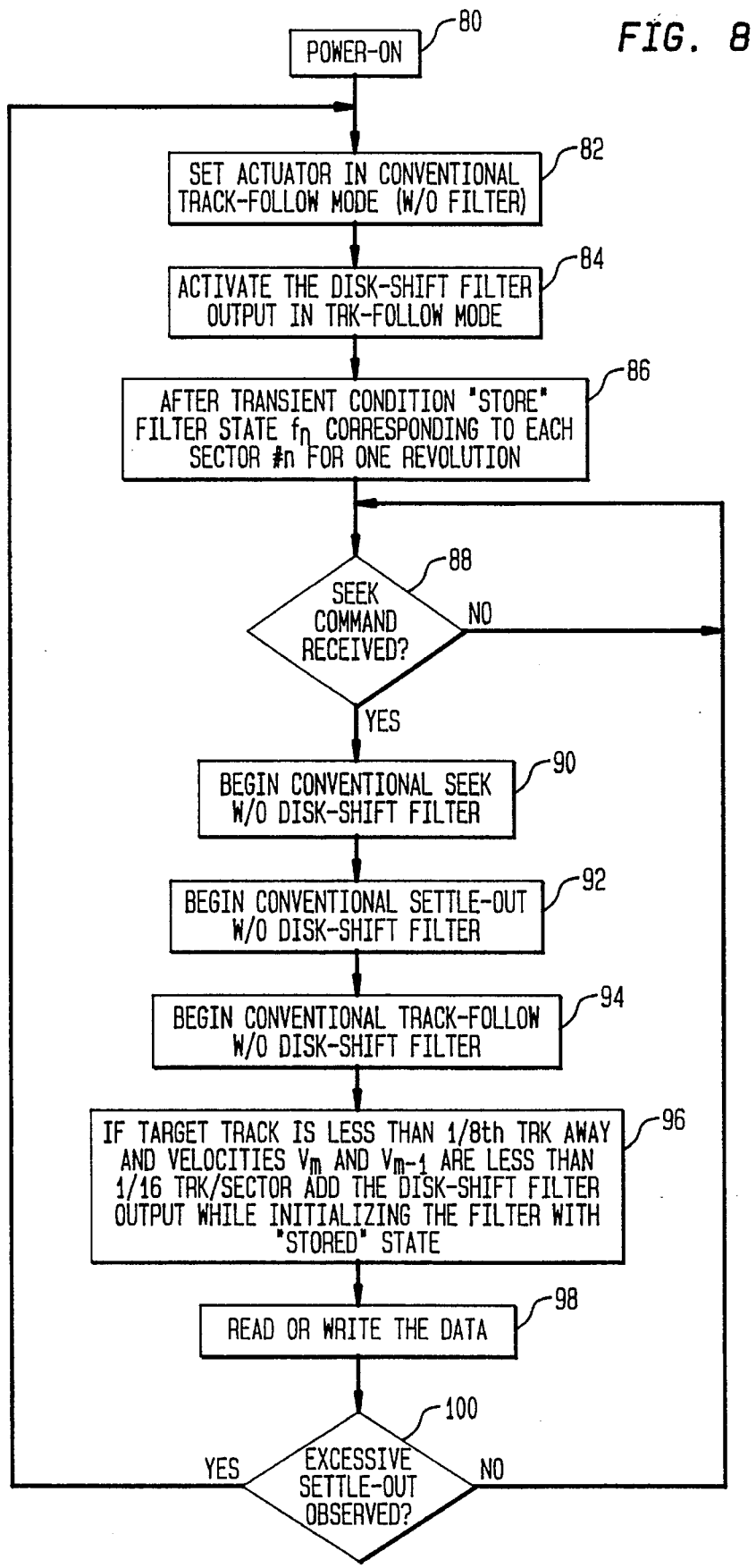

5,608,586

ROBUST SERVO FOR DISK-SHIFT COMPENSATION IN ROTATING STORAGE SYSTEM

BACKGROUND OF THE INVENTION

1. Field of the Invention

This invention relates to direct access storage devices having a rotating media. More particular, it relates to a direct access storage device (DASD) wherein a rotating storage medium interacts with a head so as to store and/or retrieve information.

2. Background Art

A head positioning servo system in a DASD performs three critical tasks. First, it moves the head from a given track to the proximity of a target track at optimum time using a velocity servo. Next, it positions the head on the target track with minimum settle-out time using a first type of position controller, such as, for example, a proportional derivative controller (PD). Finally, the servo system ensures minimum track-follow error using another type of position servo, such as, for example, a proportional integral derivative controller (PID).

The portable computer systems that employ fixed disk drives are prone to shock inputs arising from user mishandling. Above a certain shock level the fixed media in a DASD is forced to shift away from its ideal center of rotation causing an eccentricity referred to as disk-shift. In certain classes of storage devices, even in the absence of any external shock event, particularly in an optical drive with removable media, an eccentricity is present due to manufacturing tolerances. Any eccentricity in the rotating media produces a harmonic error component in the position error signal produced by the read/write head. Traditionally this is referred to as runout component, and it occurs at the spindle rotational frequency. One crucial problem is that of precise track-following in the presence of substantial eccentricity without compromising the settle-out time. To complicate matters, in a DASD with a plurality of disk-platters and heads, the disk-shift is expected to be of different magnitude for each platter. A low cost solution to this problem is desired.

Present practical track density or TPI (tracks per inch) for a magnetic disk drive is about 5 kTPI. This corresponds to a track pitch of 200 microinch. A disk shift of about 1000 microinch is easily produced when a shock level of the order of 500 g (g-gravity unit) is applied to a DASD, and it corresponds to 5 track-pitch of eccentricity. A conventional low bandwidth (400 Hz) servo system in a DASD has sufficient error rejection (about 20 dB) capability to compensate for eccentricity of the order of a fractional track pitch (e.g, 10% of track pitch) that may occur due to thermal expansion of the recording media, but will fail if substantial disk shift of the order of a track-pitch occurs due to an external shock event.

Since the eccentricity induced error component occurs at a known frequency with a measurable amplitude, feedforward servo methods can be used to reduce this error component. Feedforward methods assume that the actuator system has well defined dynamic characteristics, so that the expected error component can be minimized by producing an actuator motion in anticipation of this error. However, the actuator system is known to contain disturbance components that are not confidently predictable. For example, in the case of a rotary actuator system the pivot bearings do not behave as an ideal bearing system. The friction between sliding components becomes a source of uncertainty. Therefore, the feedforward methods are not robust in the sense that consistent track-follow performance is not assured. Further, the feedforward methods require relatively complex computations in order to produce the feedforward control signals. For example, a method proposed in U.S. Pat. No. 4,536,809 requires trigonometric manipulation of the position error signal in order to generate the control signal. In the so-called low end market, for example, in those disk drives used in personal computers, such feedforward schemes are difficult to implement in microcode because the microprocessors which implement control of the DASD tend to be less powerful than is required to perform complex arithmetic calculations.

SUMMARY OF THE INVENTION

It is an object of the invention to provide a robust method and apparatus that will eliminate track-follow error at a predetermined frequency due to disk shift without compromising the settle-out time.

It is another object of the invention to provide an initialization method that will minimize settle-out time by reducing the transient dynamic response.

It is another object of the invention to provide a method to extract the initial condition for initialization of the method or apparatus.

In accordance with the apparatus and the method of the invention, in a direct access storage device including a head positioned for interaction with a data storage medium mounted on a rotating spindle, an actuator for positioning the head, and a servo control loop for positioning the actuator, the improvement comprises providing a narrow band filter for connection in the servo control loop wherein the filter has a response frequency related to and preferably equal to the rotational frequency of the spindle and the filter has programmable initial states; switching in the narrow band filter as the head approaches a target position on the data storage medium; determining initial states of the filter and supplying the states to program the filter. The apparatus may comprise and the method may provide at least one additional filter having a peak response frequency at a harmonic of the frequency of rotation of the spindle. A determining means is provided to also determine initial states of the additional filter or filters and to supply the states to program the additional filter or filters.

The filter includes delay means for providing successive delays to inputs to the filter and for providing delayed outputs; multiplier means for multiplying selected ones of the delayed outputs by a constant; and summing means for summing the delayed outputs after the delayed output are multiplied by the multiplier means. The initial states may be stored as phase, frequency and amplitude of a sine function.

BRIEF DESCRIPTION OF THE DRAWINGS

FIG. 2A illustrates the transfer characteristics of the narrow band filter used in FIG. 2.

FIG. 8 is a flow-chart of the method according to the invention.

DETAILED DESCRIPTION OF THE PREFERRED EMBODIMENT

Figure 1:
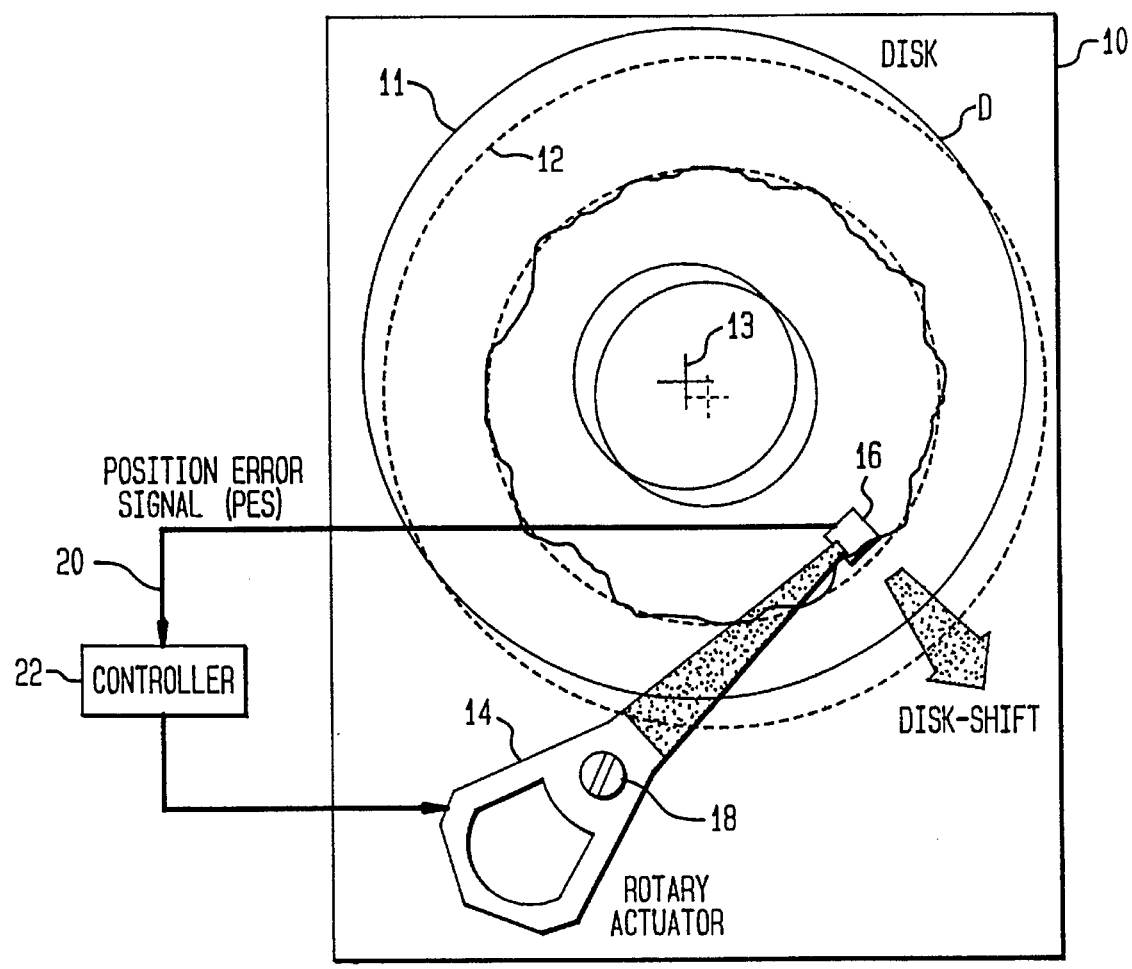
FIG. 1 is a somewhat schematic diagram which illustrates the disk-shift phenomena in a DASD having a rotary actuator system including ahead positioning servo.

Referring to FIG. 1, a rotary disk drive 10 includes a disk D shown at two positions 11 and 12 with respect to the axis of rotation of a spindle on which the disk is mounted. Position 11 represents the disk position just after the disk drive 10 has been assembled. Position 12 represents disk position in the disk drive 10 after a shock has caused the position of the disk D to shift with respect to the axis of rotation of spindle 13. Rotary actuator system 14 transports the magnetic read/write (R/W) head 16 by pivoting about the bearing assembly 18. The R/W head 16 interacts with the disk, and produces a relative position error signal (PES) 20. The relative position error between a track and the R/W head 16 is conventionally derived using a magnetic pattern which is prerecorded on the disk. In a sector servo system, the PES is derived at discrete time intervals as determined by the number of servo-sectors per track (denoted by N) and spindle motor (not shown) rotation speed. In conventional servo system terminology these discrete time intervals are referred to as sampling-times.

The PES 20 is digitized into a bit pattern by an analog to digital conversion method and presented to a microprocessor-based computer system referred to as controller 22. The controller 22 typically generates a control sequence represented by another bit pattern and is presented to a digital to analog conversion unit (DAC). A program that is executed by the controller produces the desired control sequence. The DAC typically controls the output current of a driver that is used to dynamically position the actuator system 14. In this discussion, controller 22 is generically referred to as the device which provides the functions of all the above mentioned elements and the three types of control outlined above (seek, settle out and track following). However, a hardware embodiment may consist of physically separate boundaries between some or all of these elements.

Figure 2:
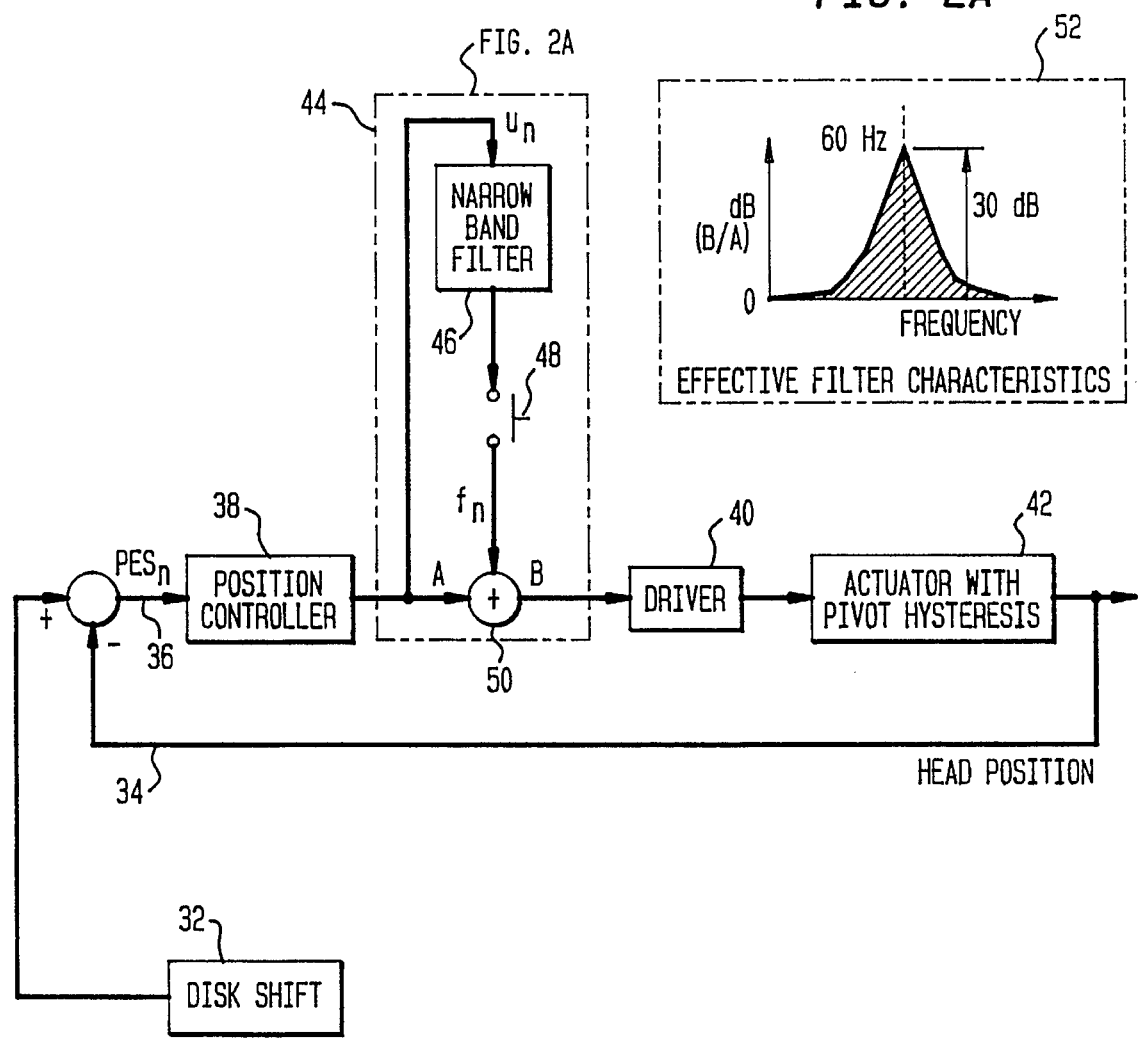
FIG. 2 is a block diagram of a prior art servo system wherein a narrow-band gain enhancing filter is used to attenuate a harmonic error component in the position error signal.

When the disk is shifted into new position 12 significant PES that is rich in amplitude corresponding to the spindle rotation frequency is produced. FIG. 2 is a prior art control system which may be used in an attempt to attenuate the errors that may arise in the PES due to a disk shift. From a control system view point, a disk-shift-induced track position signal 32 is represented in FIG. 2 as a reference signal that must be precisely followed by the R/W head 16, the position of which is represented as head position signal 34. The PES 36 is conventionally processed by a position controller 38. The output of controller 38 is presented to driver 40 through a DAC (not shown in FIG. 2). The actuator 14, R/W head 16 and pivot bearing 18 are represented in FIG. 2 by a block denoted as actuator system 42. The pivot bearing system is known to have non-ideal behavior, and is referred to as having pivot hysteresis. Since the track position is expected to have a known frequency component, a conventional control system methodology will teach, as shown in FIG. 2, that a narrow band filter operation, as defined by block 44, can be added in series with the position controller 38. The narrow band filter of block 44 has three distinct features to its realization. The filter 46 produces an output sequence $f_n$ based on an input sequence $U_n$. The output sequence is added to the conventional position controller output at a given time denoted by a switching operation 48 and summing operation 50. The transfer function characteristics 52 arising as a result of the narrow band filter 46 is illustrated in FIG. 2A. The ratio of signal amplitudes at point B to point A in block 44 schematically shows that the servo gain is enhanced at the spindle rotation frequency (e.g., 60 Hz) by a desired value (e.g., 30 dB). The use of a narrow band filter solution is effective under steady periodic conditions where settle out time of the servo system is not an issue.

Figure 3:
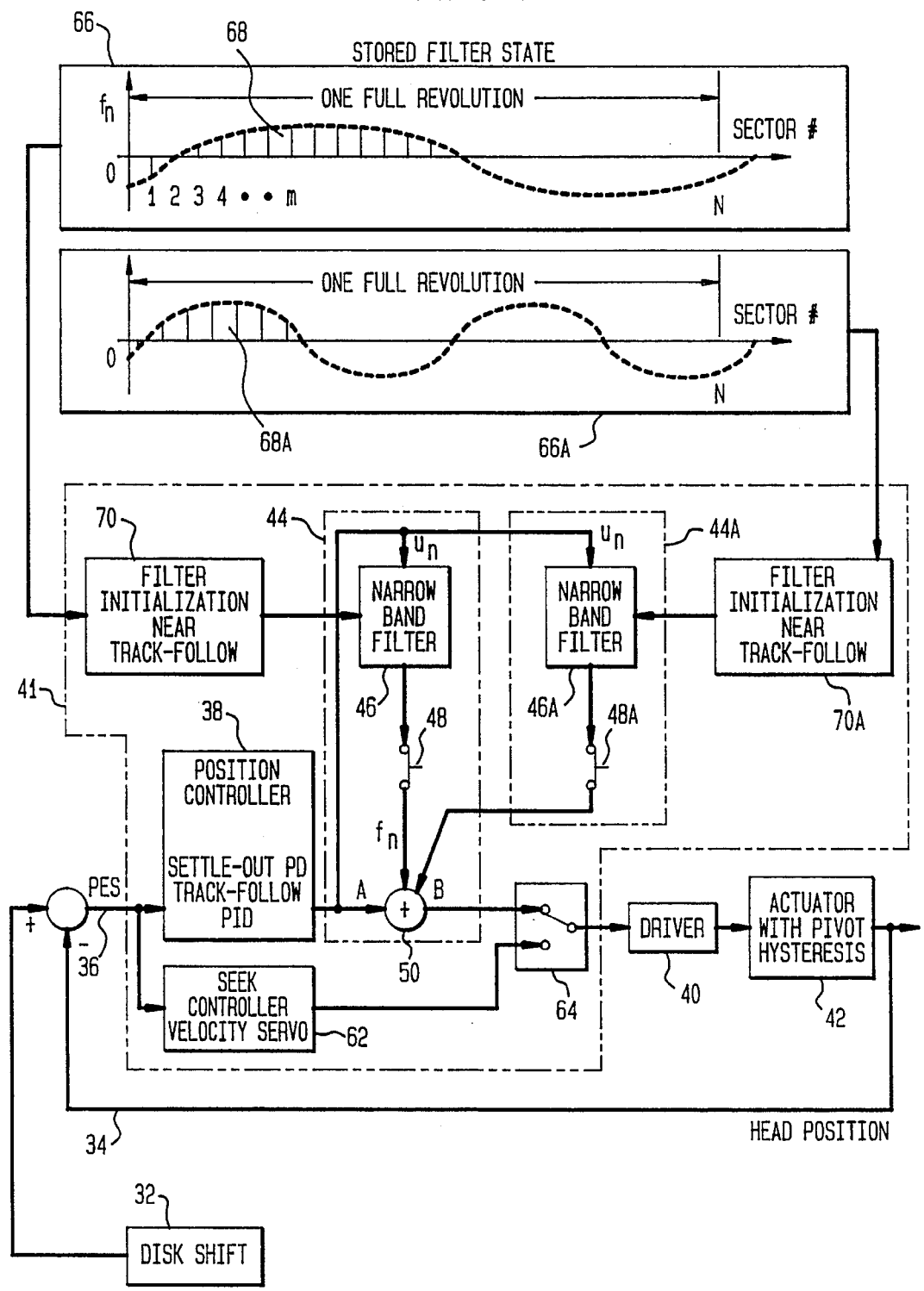
FIG. 3 is a block diagram illustrating an apparatus in accordance with the invention including a filter initialization method for minimizing settle-out transients due to narrow-band filter dynamics.

In a disk drive system, multiple tracks are randomly accessed using the mixture of three control strategies discussed above. In FIG. 3 a seek controller 62 and a switch 64 are shown. Seek controller 62, switch 64 and other blocks shown in FIG. 3 are preferably implemented by a microprocessor 41 under control of an appropriate micro-code program. The function of seek controller 62 is to produce time optimal control signals which are supplied to the driver 40 so that actuator system 42 is moved from its present tracking position to a target tracking position in minimum time while optimizing other design parameters such as level of power, acoustics, mechanical resonance excitation, etc. During the seek phase, switch 64 selects the output of seek controller 62 and a series of narrow band filters 46, 46A, etc. are not in the seek controller loop. While filter 46 is preferably tuned for the frequency of rotation of the disk, filter 46A is tuned to twice that frequency. Successive filters 46B, 46C, etc.(not shown) if used, are tuned to successive harmonics.

While the present invention will deal primarily with eccentricity of the tracks caused by disk shift, there are other anomalies, which may have frequencies related to, but not equal to the frequency of rotation of the spindle, which may be addressed using the present invention. For example, warpage of the disk surface may have a pattern at a frequency related to but not equal to the frequency of rotation of the spindle. The filter may be programmed to this frequency.

When switch 64 selects the position controller output, the system will be in either settle-out mode, with switches 48, 48A, etc., open, or track follow mode, with switches 48, 48A, etc. closed, as more fully described below with respect to FIG. 8 and FIG. 9. It will be understood by those skilled in the art that while switches 48, 48A, etc. and switch 64 are shown as hardware switches, they may be "software" switches used in the program that operates seek controller 62. If a software implementation is used, position controller 38, blocks 44, 44A etc. including filters 46, 46A, etc. and switches 48 and 48A etc., as well as seek controller 62 and switch 64 are all implemented by programming of microprocessor 41. It will also be understood that an analog implementation of each block 44, 44A etc. may be used wherein switch 48 is an analog switch controlled by position controller 38. Whether the implementation is digital, software, or analog circuitry, in general switches 48, 48A etc. and 64 are not closed at the times when the output of seek controller 62 is selected by switch 64.

Strictly, all operations related to position controller 38, and the filter system of blocks 44, 44A, etc. are nullified during seek. Only seek controller 62 is allowed to control the driver 40. Once the R/W head is positioned by actuator system 42 so as to be in the proximity of the target track, the position controller 38, that is optimized for minimum settle-out time, is activated. Once the actuator system 42 places the R/W head within an error band determined either by PES 36 and/or a signal from a velocity estimator (not shown), the position controller is modified for optimum track following. Whenever a significant PES is detected and the DASD is unable to attain the error criteria required to achieve a safe write or error free read operation, the R/W operation is not attempted and a recovery process is initiated. The recovery process is a two step operation. First the narrow band filter 46 of block 44 is switched into the control loop using switch 48 The filter requires a feedback driven learning process of its own in order to generate an effective control signal. After one or two revolutions of the spindle has elapsed, the filter 46 of block 44 may produce a control signal that would eventually achieve a PES with acceptable error margin for successful R/W operations. Thus the use of a narrow band filter facilitates attenuation of disk shift induced spindle runout component, but it incurs additional settle-out time delay amounting to the time required for one or two spindle revolutions. This time delay, of the order of 20 to 30 ms, is not attractive for computer storage mechanisms. The prior art does not teach when and how to activate such a narrow band filter without requiring extra revolutions of the spindle in order to prevent degradation of the settle-out performance. A narrow band filter 46 such as the one shown in FIG. 3 is preferably at least of the second order digital filter type. It operates by summing the weighted values of present and past samples corresponding to indices "n", "n−1" and "n−2", of the filter input and/or output components. The index "n-1" denotes the digital value of the signal delayed by a unit sampling time. Thus if the index "n" is associated with a present PES value derived from sector "n", the index "n−1" corresponds to the value associated with the previous sector "n−1" and so forth. In the prior art, when the filter is switched in to produce the compensating or output sequence $f_n$, for example, at sampling instant "m" corresponding to sector "m", the filter is activated with null initial values for the previous states "m−1" and "m−2". Thus the filter initialization in the prior art is achieved without regard to the disk-shift condition. The present invention teaches how to initialize the narrow band filter so that the values of the compensating sequence $f_m$, $f_{m+1}$ etc., are produced in such a way that time delay incurred in attenuating the spindle runout is more or less eliminated.

Since the runout component is periodic, a close observation of filter time sequence (while the filter is active) also shows that it will also be periodic with a known amplitude. At power-up condition or during times when the DASD is idle, the narrow band filter is activated in track-follow mode, and once the filter reaches a steady operating condition, say within three to four spindle revolutions, the filter state is captured and remembered as a sequence of numbers whose index is associated with the corresponding sector as shown inside block 66. For one full revolution of the disks of a DASD with "N" number of PES sectors, there will be only "N" values of $f_n$ required per disk platter as indicated by 68. For a polynomial form of digital filter realization "N" sectors will only require "N" filter samples. For other forms of realization, such as a state variable filter, 2*N samples may be required for "N" sector DASDs.

Once the filter state is stored, the DASD is now ready to perform a random seek First a seek operation is performed during which the filter is temporarily removed from the loop. As the R/W head reaches the proximity of the target track, the settle-out controller is initialized without the narrow band filter. Once the R/W element reaches the target track within an error of ⅛ of a track-pitch with sufficiently low velocity (of the order of ¹⁄₁₆th of a track/sector), the narrow band filter is activated to produce the output sequence $f_m$, $f_{m+1}$ etc. based on the "stored" state of the filter corresponding to sectors "m−1", "m−2" etc. The filter initialization operation of block 70, derived from block 66, represents a critical aspect of the manner in which the invention is distinguishable from the prior art. The present invention is also distinguishable from the prior art in that, as represented by block 66A, amplitude values for at least one harmonic (in block 66A at twice the frequency of spindle rotation) may be captured, stored and used to program filter 46A, by way of block 70A.

The filter states are generated by relatively simple arithmetic processes instead of using complex number or trigonometric operations. Further, the filter in feedback loop configuration will produce an appropriate amplitude level necessary to attenuate a given runout while automatically accounting for the non-deterministic nature of the actuator system 42. This aspect provides not only simplicity in computational requirements but also robustness.

Figure 4:
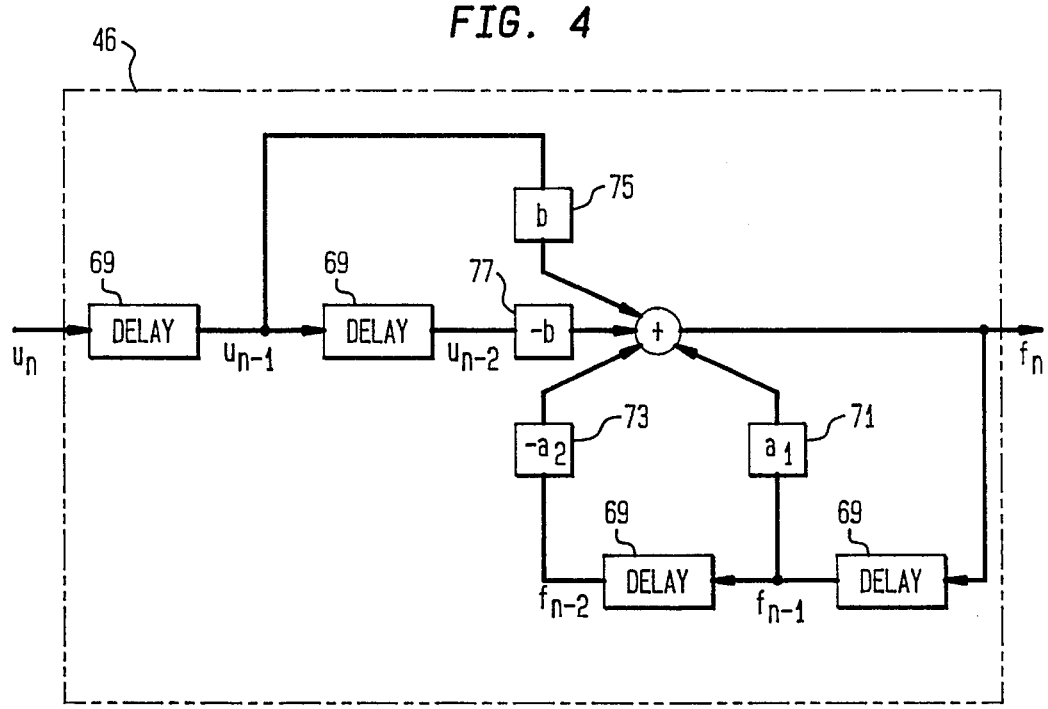
FIG. 4 is a block diagram of a first embodiment of the narrow band filter of FIG. 3.

FIG. 4 shows a specific implementation of a narrow band filter which is inserted between the position controller 38 and driver 40 in a cascade configuration. This implementation of filter 46 uses a second order narrow-band filter with finite gain of approximately 30 dB at 60 Hz. The filter is implemented digitally by summing delayed and weighted input and output signal level values under software control in a microprocessor which runs block 38. Outputs $u_n$ from the delay blocks 69, which provide a delay of a single sampling time, are multiplied by the weighting values (generally constants) $a_1, -a_2$, b and −b as represented by blocks 71, 73, 75 and 77, respectively, in FIG. 4, and the outputs are then summed.

Figure 5A:
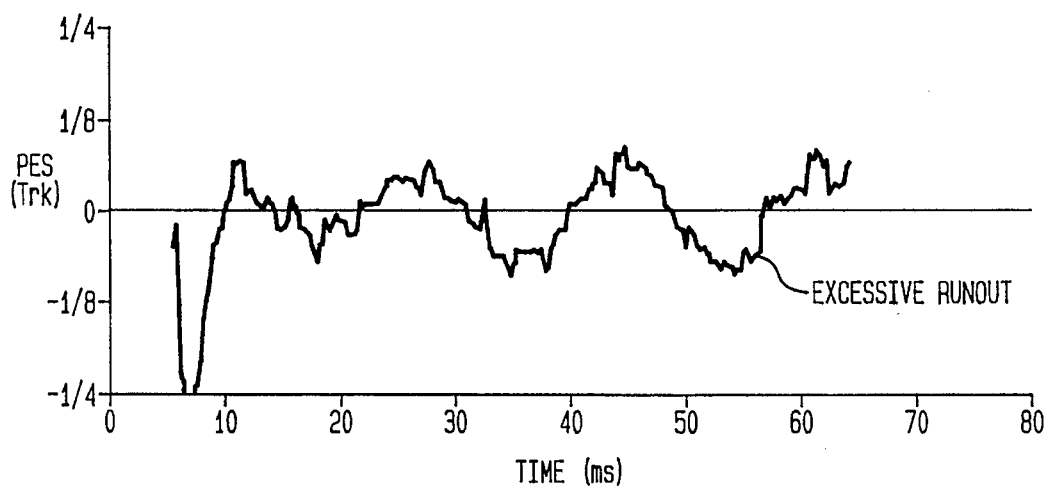
FIG. 5A, FIG. 5B and FIG. 5C are graphical representations of the position error signal (PES) during settle-out phase obtained in a disk drive when no narrow band filter is used, when a cascade narrow band filter of FIG. 4 with 30 dB gain is used with initial conditions set to zero, and when the cascade narrow band filter is used with optimum initial conditions, respectively.
Figure 5B:
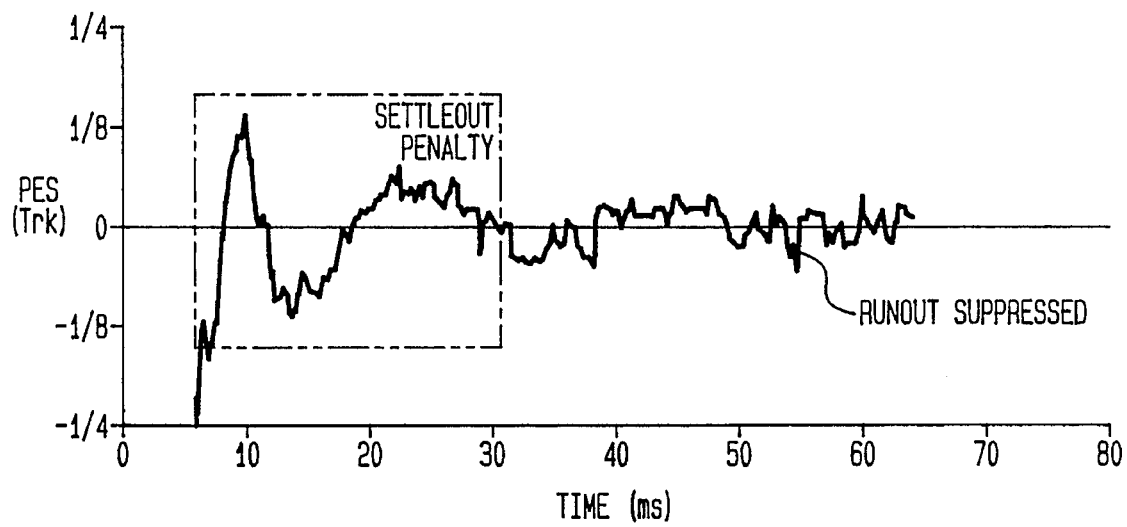
Figure 5C:
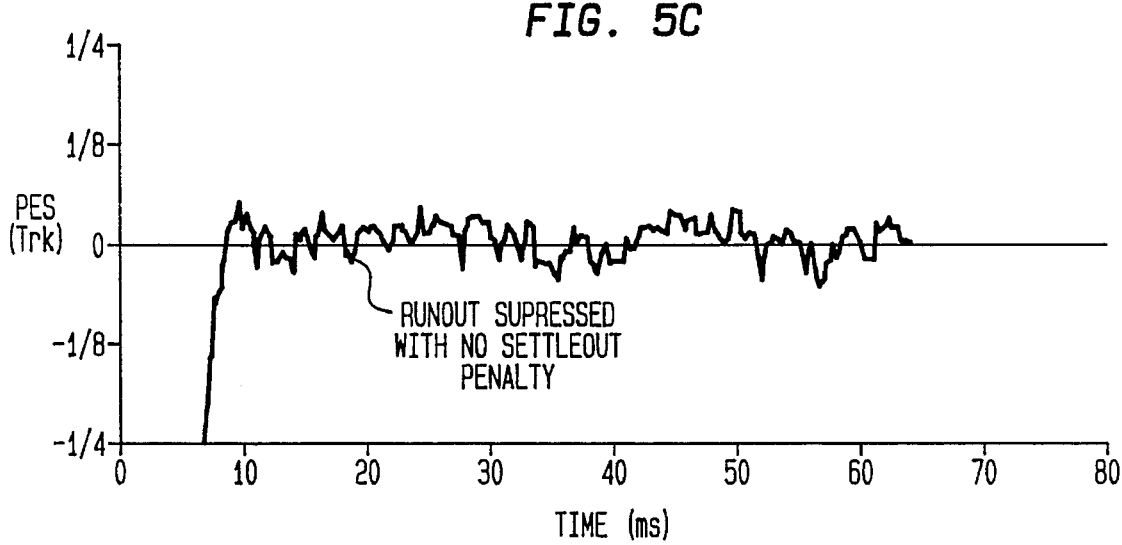

FIG. 5, FIG. 5B and FIG. 5C show the position error signal (PES) during settle-out phase obtained in a disk drive with a track density of 2400 TPI. Estimated disk shift is about ½ track pitch. Each PES time history corresponds to a different cascade filter condition. In FIG. 5A no cascade narrow band is filter used (only the position servo effective is with a gain of about 20 dB at the spindle frequency). In FIG. 5B a cascade narrow band filter with 30 dB gain is used with zero initial conditions of the filter state. In FIG. 5C a cascade narrow band filter is used with optimum initial conditions. Initial conditions are obtained by capturing the value of the filter state during more than one revolution of the disc and storing the average filter state value during these revolutions.

Figure 6:
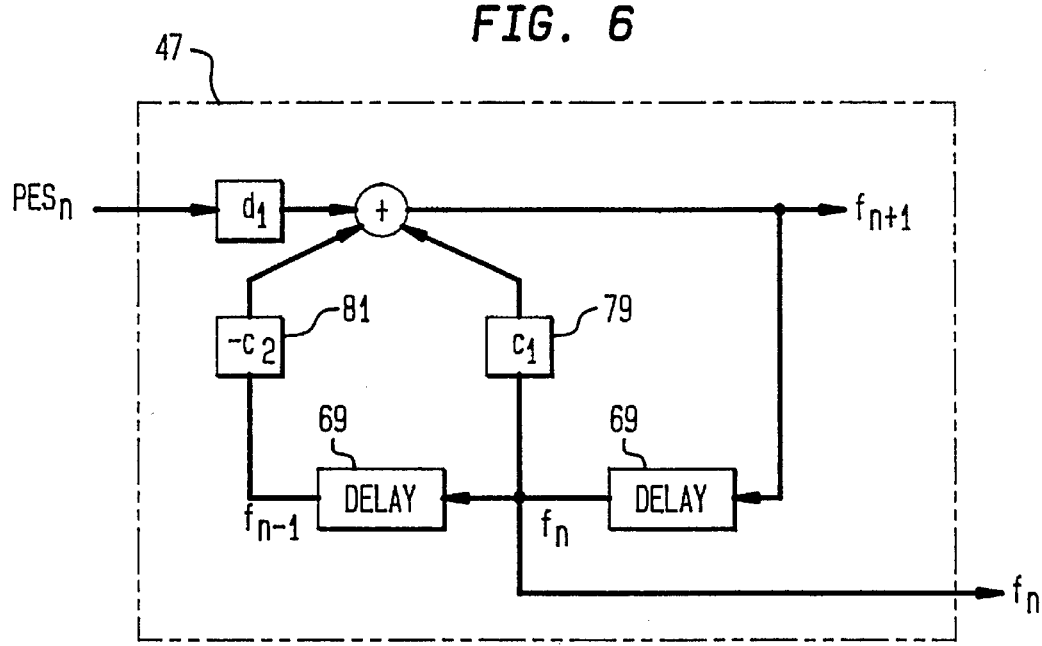
FIG. 6 is a block diagram of a second embodiment of a narrow band filter structure in accordance with the invention.

FIG. 6 shows an alternative implementation of the filter concept. In this case the filter 47 is configured in parallel form with an infinite gain at the spindle frequency (3800 RPM). The filter computation details are not comparable to the cascade 30 dB gain filter in a sense that the delay states are not similar. As shown in FIG. 6, the delayed values from delay elements 69, delayed by one sampling time, are multiplied by weighting factors or constants $c_1$ and $-c_2$ as represented by blocks 79 and 81, respectively. These output are summed with the inputs PES multiplied by a weighting factor or constant $d_1$.

Figure 6A:
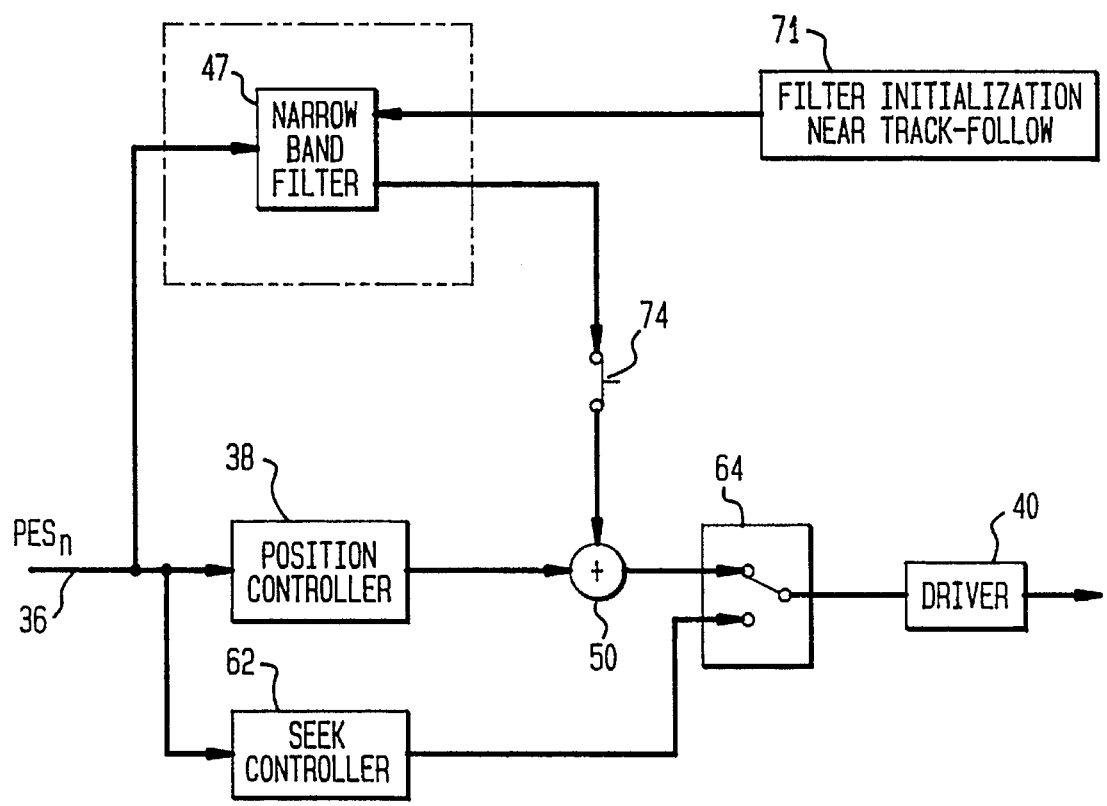
FIG. 6A is a block diagram showing the connection of the fitter of FIG. 6 in a servo system in accordance with the invention.

Referring to FIG. 6A, the initialization operation of block 71 is similar in concept to that of block 70. The PES signal 36 is supplied to position controller 38 and to narrow band filter 47 in parallel. During use of filter 47, switch 74 is closed under the control of microprocessor 41 (FIG. 3), and the outputs of narrow band filter 47 and position controller 38 are summed in summer 50. The output of summer 50 is 5provided to the input of driver 40. It will be understood that as in the case of FIG. 3, several additional narrow band filters 47A, 47B, etc. may be used, with each filter acting on a different harmonic of the rotational frequency of the disk and having its initial states determined as described above with respect to FIG. 3.

Figure 7A:
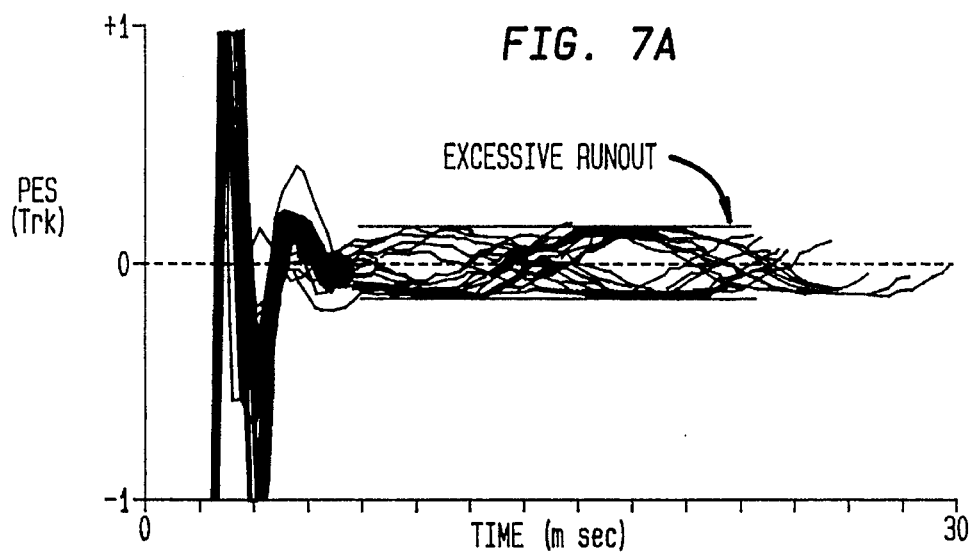
FIG. 7A, FIG. 7B and FIG. 7C are graphical representations of the position error signal (PES) during settle-out phase obtained in a disk drive with when no parallel narrow band filter is used, when the parallel narrow band filter of FIG. 6 is used with initial conditions set to zero, and when the parallel narrow band filter is used with optimum initial conditions, respectively.
Figure 7B:
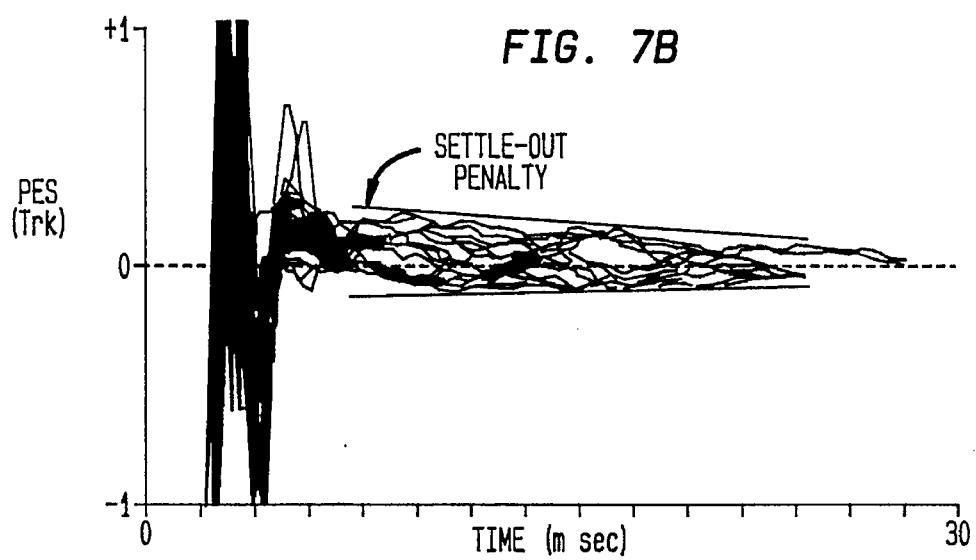
Figure 7C:
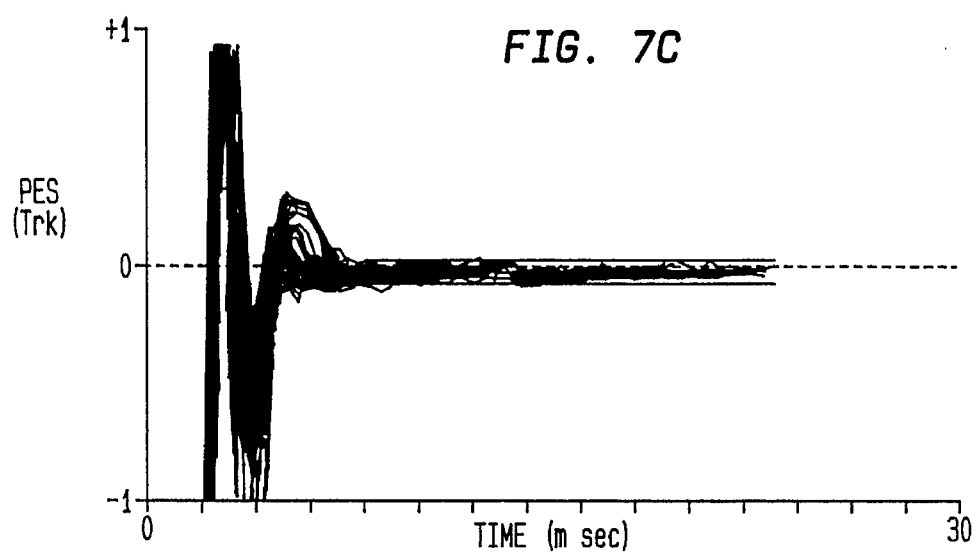

FIG. 7A, FIG. 7B and FIG. 7C show the position error signal (PES) during the settle-out phase obtained in a disk drive with a track density of 5300 TPI. Estimated disk shift is about 1 track pitch. Each PES time history corresponds to different parallel filter conditions. In FIG. 7A no parallel narrow band filter is used (only the position servo is effective with a gain of approximately 20 dB at the spindle frequency). In FIG. 7B a parallel narrow band filter is used with initial conditions of the filter set to zero. In FIG. 7C a parallel narrow band filter is used with optimum initial conditions. The initial conditions are obtained by capturing filter states sampled during a single revolution of the disk with no averaging. The removal of excessive settle-out delay incurred due to the use of a narrow band filter is apparent.

FIG. 8 is a flow chart of the method according to the invention as implemented by microprocessor 41. At step 80, the DASD is powered on Step 82 the servo system is set in the conventional track follow mode without the use of the narrow band filter, as described above. At step 84, switch 48 (FIG. 3) or switch 74 (FIG. 6A) is closed. After a period during which transients due to the closing of switch 48 die out, at step 86, filter state values $f_n$ corresponding to each sector, for one revolution of the disk, are stored (66 and 68 of FIG. 3, as well as 66A and 68A, if a filter at a harmonic frequency of the spindle frequency is being used). The stored values may be those obtained after a single revolution of the disk. Alternatively, the average value for each sector obtained upon several revolutions of the disk may be utilized to increase the probability of having determined the most likely values.

At step 88, a waiting loop is initiated to wait for a seek command As long as no command is received, continuous looping through step 88 occurs. When a seek command is received, the program proceeds to step 90 where a conventional seek, without the disk shift filter in place, is executed, as more fully described above. At step 92, a conventional settle-out mode is initiated without the filter in accordance with the invention being utilized. At step 94, conventional track following begins but the filter is still not utilized.

At step 96, if certain criteria are met, the output of the narrow band filter or filters is connected by the appropriate switch, as described above, and the filter is initialized with the stored states (FIG. 3). For example, criteria for this to occur may be that the head is 1/8 of a track or less away from the target track and that two successive head velocities are less than 1/16 of a track of motion per disk sector. At step 98, a read or write operation is conducted while meeting conventional track following criteria for read or write. For example, the PES could have an amplitude of less than 8–10% of that associated with the track pitch.

When the read or write operation of step 98 has been concluded, a test is done at step 100 to determine whether the most recent settle-out required excessive time; i.e. too many sectors passed until settle-out was completed. If the time for settle-out was not excessive, then the program loops back to step 88 and simply waits for another seek command, as discussed above. If excessive settle-out time was required then the program loops back to step 82. Steps 82, 84 and 86 are performed again to store new values for the filter state corresponding to each sector, as outlined above with respect to step 86. This could occur, for example, as a result of thermally induced changes in runout or changes in the characteristics of the actuator system as a function of time from when the system is powered up.

Figure 9:
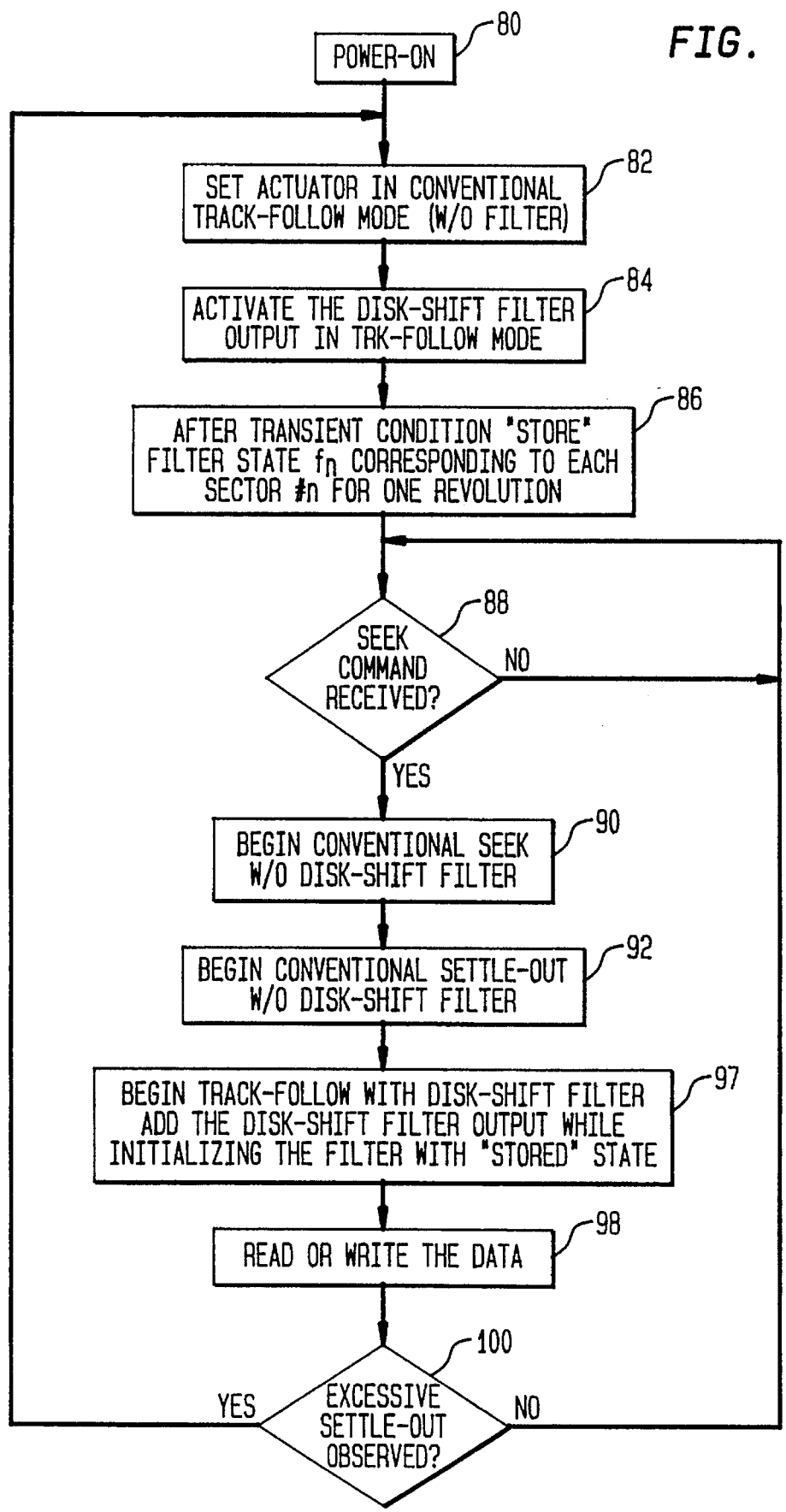
FIG. 9 is a flow chart of a modification of the method of FIG. 8.

Referring to FIG. 9, the steps are identical to those of FIG. 8, except that after step 92 the program proceeds to step 97 where track following begins with the disk shift filter engaged. In other words, steps 94 and 96 of FIG. 8 occur simultaneously at step 97 of FIG. 9 with the beginning of the track following operation. In all other respects operation is identical to that of FIG. 8.

Figure 10:
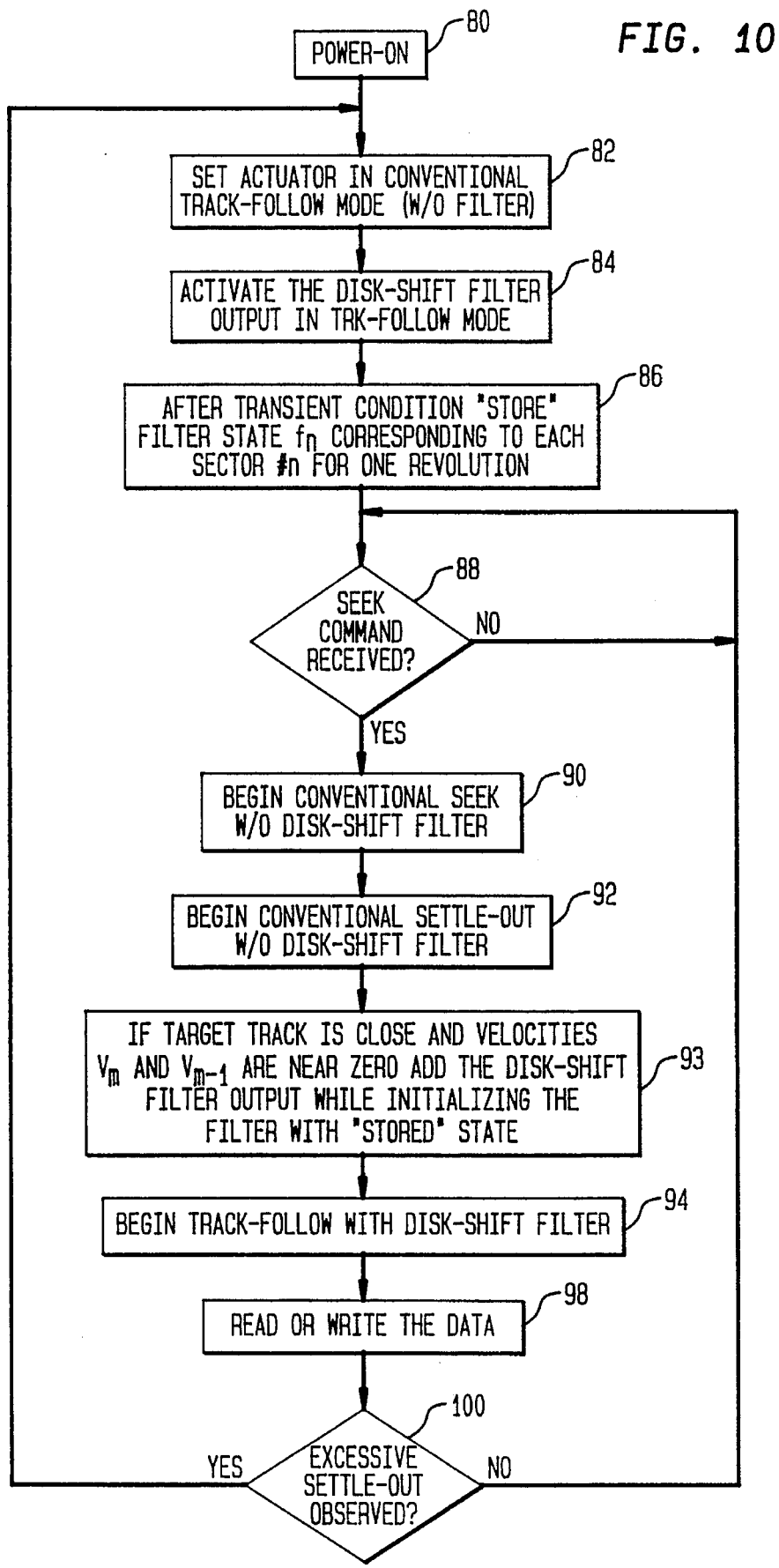
FIG. 10 is a flow chart of another modification of the method of FIG. 8.

FIG. 10 illustrates an example where it may be advantageous to engage the filter before entering the track following mode. After step 92, the program proceeds to step 93. If the head is sufficiently close to the target track and two successive head velocities are below a predetermined level, then the filter is engaged in a manner analogous to that of step 96 of FIG. 8. The program then proceeds to step 94 where track following is commenced with the filter operating. In all other respects, operation of the method of FIG. 10 is identical to that of FIG. 8.

It will be understood that the program code for implementing one of the flow charts of FIG. 8, FIG. 9 or FIG. 10 is normally stored on the disk itself. The problem that may present itself under these circumstances is that in the presence of large disk shift, it may not be possible to read the program off the disk so that microcontroller 41 can use the program. In order to solve this problem, under startup conditions, the filter in accordance with the invention may be switched in without initializing the filter. Under these conditions, the transient response will not be favorable and will require an amount of time that under normal operating conditions would be excessive. However, during the startup sequence, which generally takes an extended period of time in any event, the delay is not objectionable. Once the transient has died down and sufficient stability exists to read from the disk, the program represented by the flow charts of FIG. 8, FIG. 9 or FIG. 10 is read from the disk for implementation by microprocessor 41. This is done after power-up but before servicing an external seek request from the host computer to which the DASD is connected.

The present invention may be generalized for application to DASD's having multiple disks mounted for rotation on a common spindle. The runout experienced by each disk may be different. While a single actuator and servo loop are used, the filter in accordance with the invention must be programmed for different initial conditions if the runout varies from disk to disk, as will generally be the case. In order to service multiple platter DASD's, it is merely necessary to provide different initial conditions to the filter as different platters are accessed. This can be done by storing sets of initial conditions during the initial startup phase. Alternatively, if an external seek request is to be promptly serviced, different sets of initial conditions can be stored during later idle periods.

While it is believed that the heads servicing a top surface and a bottom surface of the same platter will have similar disk shift runout components, in fact they may not be identical. Other errors, such as those due to servo writing may also come into play.

Thus, in the limit, it may be desirable to store initial slate data for the filter for every disk surface, rather than merely for every platter (that is merely for every two surfaces).

It will also be understood that the magnitude of file runout may vary somewhat across the radius of the disk. Thus, as track density increases, it may be desirable to store different initial conditions for the filter at various radial positions of the actuator with respect to the disk. Further, as noted above, this can be done for each disk surface in a multiple platter DASD.

If the amplitude is stored for every sector, then a significant amount or data must be stored. It will be understood that as track density and disk capacity increases, this will not be a significant burden upon the storage space. However, if the runout component is well approximated by a sinusoidal function, generally the case, it is possible to store significantly less data. A table may be store the basic sine values. To determine the initial states to be used for a particular filter configuration for a given disk surface, or radial position, or filter frequency, it is only necessary to store amplitude, phase and frequency. As long as the runout approximates the sinusoidal function, using these values to access the appropriate amplitude values from the table is all that is necessary to program the appropriate filter or fillers (multiple frequency case). Thus, a relatively small amount or data can be stored and yet filter or filters can be properly initialized for a variety of conditions.

While the invention has been described with particular reference to a DASD wherein the disk is fixedly mounted to the spindle, runout problems also exist in those storage devices having removable storage media such as, for example, an optical storage system or a removable disk magnetic storage system. While access time may not be as critical in the case of a system using a removable magnetic storage media (a so-called floppy disk drive), it is regarded as being of importance in the case of optical storage systems. The present invention may be directly applied to such optical storage systems to relax the mechanical tolerances required and, therefore, to significantly reduce cost of the removable optical disk cartridge.

Thus, the invention provides a low cost method and apparatus for achieving rapid settle out, while using a narrow band filler to enhance track following capability in the presence of disk shift. It can be implemented in an existing low end DASD having a controller operated by a microprocessor with relatively low computational capability in the manner described above.

We claim:

1. In a direct storage device including a head positioned for interaction with a data storage medium having tracks and being mounted on a rotating spindle, an actuator for positioning said head, and a servo control loop for controlling said actuator, said servo control loop having a seek mode of operation during which said head is brought to a position close to a desired track of said data storage medium and a track following mode of operation during which said head is caused to follow said desired track, the improvement comprising:

a narrow band digital filter, said filter summing weighted variables to produce a next output value of said filter, said variables including at least one present input value to said filter and at least one previous output value of said filter, said filter having a peak response frequency equal to the rotational frequency of the spindle, said filter having a programmable initial value for said at least one previous output value of said filter;

means for switching the narrow band filter into the servo control loop during selected periods of time that each include at least a portion of time that the servo control loop is in the track following mode of operation and for switching the narrow band filter out of the servo control loop during the entire seek mode of operation of the servo control loop;

means for determining and storing during an idle period of said device, and when said servo control loop is in said track following mode and after transients have died out, an output value of said filter for each one of a multiplicity of predetermined different rotary positions of said data storage medium; and means for programming said filter, when said filter is switched into the servo control loop, with an initial value for said at least one previous output value, said initial value being derived from at least one of said stored output values selected in accordance with the rotary position of said data storage medium when said filter is switched into the servo control loop.

2. The device of claim 1, wherein the determining and storing means determines and stores the output values of the filter during powering up of the device.

3. The device of claim 1 further comprising at least one additional digital filter having a peak response frequency at a harmonic of the frequency of rotation of the spindle, said additional filter summing weighted variables to produce a next output value of said additional filter, said variables including at least one present input value to said additional filter and at least one previous output value of said additional filter, said additional filter having a programmable initial value for said at least one previous output value of said additional filter, said determining and storing means also determining and storing an output value of said additional filter for each one of said multiplicity of predetermined different rotary positions of said data storage medium, said switching means also switching the additional filter into and out of the servo control loop and said programming means supplying to said additional filter, when said additional filter is switched into said servo control loop, an initial value for said at least one previous output value of said additional filter derived from at least one of said stored output values of said additional filter selected in accordance with the rotary position of said data storage medium when said additional filter is switched into the servo control loop.

4. The device of claim 1 wherein said servo control loop includes a head position controller and said filter is connected in series with said head position controller.

5. The device of claim 1 wherein said servo control loop includes a head position controller, and said filter is connected in parallel with said head position controller.

6. In a direct storage device including a head positioned for interaction with a data storage medium having tracks and being mounted on a rotating spindle, an actuator for positioning said head, and a servo control loop for controlling said actuator, said servo control loop having a seek phase of operation during which said head is brought to a position close to a desired track of said data storage medium and a track following mode of operation during which said head is caused to follow said desired track, the method comprising:

providing a narrow band digital filter, said filter summing weighted variables to produce a next output value of said filter, said variables including at least one present input value to said filter and at least one previous output value of said filter, said filter having a peak response frequency equal to the rotational frequency of the spindle, said filter having a programmable initial value for said at least one previous output value of said filter;

switching the narrow band filter into said servo control loop during selected periods of time that each include at least a portion of time that the servo control loop is in the track following mode of operation and for switching the narrow band filter out of the servo control loop during the entire seek mode of operation of the servo control loop;

determining and storing during an idle period of said device, and when said servo control loop is in said track following mode and after transients have died out, an output value of said filter for each one of a multiplicity of predetermined different rotary positions of said data storage medium; and programming said filter, when said filter is switched into the servo control loop, with an initial value for said at least one previous output value, said initial value being derived from at least one of said stored output values selected in accordance with the rotary position of said data storage medium when said filter is switched into the servo control loop.

7. The method of claim 6, wherein the step of determining and storing is performed during powering up of the device.

8. The method of claim 6 further comprising the steps of:

providing an additional digital filter having a peak response frequency at a harmonic of the frequency of rotation of the spindle, said additional filter summing weighted variables to produce a next output value of said additional filter, said variables including at least one present input value to said additional filter and at least one previous output value of said additional filter, said additional filter having a programmable initial value for said at least one previous output value of said additional filter;

determining and storing an output value of said additional filter for each one of said multiplicity of predetermined different rotary positions of said data storage medium;

switching the additional filter into the servo control loop during the track following mode of operation and out of the servo control loop during the seek mode of operation; and supplying to said additional filter, when said additional filter is switched into said Servo control loop, an initial value for said at least one previous output value of said additional filter derived from at least one of said stored output values of said additional filter selected in accordance with the rotary position of said data storage medium when said additional filter is switched into the servo control loop.

9. The method of claim 6 wherein said servo control loop includes a head position controller and further comprising connecting said filter in series with said head position controller.

10. The method of claim 6 wherein said servo control loop includes a head position controller, comprising the additional step of connecting said filter in parallel with said head position controller.

11. A method for operating a direct access storage device having a head positioned for interaction with a data storage medium on a rotating spindle, an actuator for positioning said head, a servo control loop for controlling said actuator, said servo control loop having a seek mode of operation during which said head is brought to a position close to a desired track of said data storage medium and a track following mode of operation during which said head is caused to follow said desired track, and a narrow band filter that is switched into the servo control loop during the track following mode and out of the servo control loop during the seek mode of operation, the method comprising the steps of:

placing the servo loop in a track following mode with the filter switched into the servo control loop and after transients have died down storing the output value of the filter for each one of a multiplicity of rotary positions of the disk; and thereafter, whenever the filter is switched into the servo control loop, initializing the filter with at least one value derived from at least one of the stored output values of the filter selected in accordance with the rotary position of said data storage medium when said filter is switched into the servo control loop.

12. The method of claim 11 wherein the filter is switched into the servo control loop after the track following mode of operation begins.

13. The method of claim 11 wherein the filter is switched into the servo control loop as the track following mode Of operation is commenced.

14. The method of claim 11 wherein the servo control loop also has a settle out mode of operation that occurs after the seek mode of operation and during which transient oscillations die out before the servo control loop enters the track following mode of operation, and wherein said filter is switched into said servo control loop during said settle out mode of operation.

* * * * *